(12) United States Patent
Varughese et al.

(10) Patent No.: US 12,483,328 B2
(45) Date of Patent: Nov. 25, 2025

(54) DEVICES, SYSTEMS, AND METHODS FOR PROCESSING OPTICAL COMPONENTS

(71) Applicant: Georgia Tech Research Corporation, Atlanta, GA (US)

(72) Inventors: Siddharth Jacob Varughese, Atlanta, GA (US); Stephen E. Ralph, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 687 days.

(21) Appl. No.: 17/774,210

(22) PCT Filed: Nov. 5, 2020

(86) PCT No.: PCT/US2020/059086
§ 371 (c)(1),
(2) Date: May 4, 2022

(87) PCT Pub. No.: WO2021/092156
PCT Pub. Date: May 14, 2021

(65) Prior Publication Data
US 2022/0407595 A1    Dec. 22, 2022

Related U.S. Application Data

(60) Provisional application No. 63/057,572, filed on Jul. 28, 2020, provisional application No. 62/930,681, filed on Nov. 5, 2019.

(51) Int. Cl.
H04B 10/07     (2013.01)
H04B 10/073    (2013.01)
(Continued)

(52) U.S. Cl.
CPC .......... *H04B 10/0731* (2013.01); *G06N 3/02* (2013.01); *H04B 10/07* (2013.01); *H04B 10/079* (2013.01);
(Continued)

(58) Field of Classification Search
CPC .. H04B 10/0731; H04B 10/07; H04B 10/079; H04B 10/0795; H04B 10/0799; G06N 3/02
(Continued)

(56) References Cited

U.S. PATENT DOCUMENTS 8,009,981 B2 *  8/2011  Swenson ............ H04B 10/0731
                                                    398/16
8,111,986 B1 *  2/2012  Lindsay ............. H04B 10/0799
                                                    398/16
(Continued)

FOREIGN PATENT DOCUMENTS

CN          107342810 B       11/2019

OTHER PUBLICATIONS

Echeverri-Chacon et al, Transmitter and Dispersion Eye Closure Quaternary (TDECQ) and Its Sensitivity to Impairments in PAM4 Waveforms, Feb. 2019, JOLT, All Document. (Year: 2019).*

(Continued)

*Primary Examiner* — Dibson J Sanchez
(74) *Attorney, Agent, or Firm* — TROUTMAN PEPPER LOCKE LLP; Ryan A. Schneider; Stephanie J. Remy

(57) ABSTRACT

A method comprising: receiving optical output data of an optical device; supplying the optical output data to a trained neural network configured to transform optical output data to optical performance metrics; and executing the trained neural network to transform the supplied optical output data to optical performance metrics for the optical device.

13 Claims, 9 Drawing Sheets

(51) Int. Cl.
*G06N 3/02* (2006.01)
*H04B 10/079* (2013.01)

(52) U.S. Cl.
CPC ...... *H04B 10/0795* (2013.01); *H04B 10/0799* (2013.01)

(58) Field of Classification Search
USPC .......................................... 398/9–38
See application file for complete search history.

(56) References Cited

U.S. PATENT DOCUMENTS

| | | | | |
|---|---|---|---|---|
| 10,396,897 | B1* | 8/2019 | Malave | H04B 10/07955 |
| 10,727,973 | B1* | 7/2020 | Kumar | H04L 45/70 |
| 11,321,562 | B2* | 5/2022 | Zheng | H04B 10/524 |
| 2009/0257745 | A1* | 10/2009 | Petrilla | H04B 10/0799 398/30 |
| 2015/0318919 | A1* | 11/2015 | Dawe | H04L 1/20 398/16 |
| 2018/0074096 | A1* | 3/2018 | Absher | G01R 23/16 |
| 2019/0038387 | A1 | 2/2019 | Chu et al. | |
| 2020/0035665 | A1 | 1/2020 | Chuang et al. | |
| 2021/0034918 | A1* | 2/2021 | Schaefer | G06V 10/454 |
| 2021/0111794 | A1* | 4/2021 | Huang | H04B 10/2507 |
| 2022/0182139 | A1* | 6/2022 | Zhang | H04B 10/0799 |

OTHER PUBLICATIONS

Mane et al, A Survey on Supervised Convolutional Neural Network and Its Major Applications, Jul. 2017, International Journal of Rough Sets and Data Analysis, vol. 4, Issue 3, All Document. (Year: 2017).*
International Search Report and Written Opinion from Application No. PCT/US2020/059086 dated Feb. 2, 2021.
Wang, et al., "Intelligent Constellation Diagram Analyzer Using Convolutional Neural Network-Based Deep Learning," Jul. 24, 2017 Optics Express vol. 25, No. 15.
Office Action from Japanese Patent Application No. 2022-525476 dated Jun. 17, 2024.
Jargon, et al. "Optical Performance Monitoring Using Artificial Neural Networks Trained With Eye-Diagram Parameters", IEEE Photonics Technology Letters, Jan. 2009, vol. 21, No. 1, pp. 54-56.
Wu, et al., "Training of neural networks to perform optical performance monitoring of a combination of accumulated signal nonlinearity, CD, PMD, and OSNR", LEOS 2008—21st Annual Meeting of the IEEELasers and Electro-Optics Society, 2008, pp. 543-544.
Jones, et al., "Heterogeneously Integrated InP/Silicon Photonics: Fabricating Fully Functional Transceivers", IEEE Nanotechnology Magazine, Mar. 2019, vol. 13, No. 2, pp. 17-26.
Imai Mitsubishi Electric Technical Report, Mar. 2019, "400-Gbps Small Accumulation EML-TOSA", 93rd Volume besides Grand, No. 3, pp. 172-176.

* cited by examiner

DEVICES, SYSTEMS, AND METHODS FOR PROCESSING OPTICAL COMPONENTS

CROSS-REFERENCE TO RELATED APPLICATIONS

This application claims the benefit of U.S. Provisional Application Nos. 62/930,681 filed Nov. 5, 2019 and 63/057,572 filed Jul. 28, 2020, the entireties of which are incorporated herein by reference as if set forth in full below.

FIELD

Devices, systems, and methods for processing optical components and for assessing qualities of optical components.

BACKGROUND

Optical components can be used in optical systems to control the state of light in a predictable and desired manner and to detect these altered states. For example, optical components are commonly used to generate and transmit signals (e.g., data signals) at high speeds and are also used to receive and detect optical signals at high rates, thus enabling high data capacity optical communication systems. Optical components can interact with light by way of reflection, refraction, diffraction, absorption, etc.

Developments in optical components, such as the ability to generate and detect complex optical waveforms representative of higher-order modulation formats, have enabled higher capacity optical communication links with higher throughput. These components are key enablers of data center networks, WDM fiber-optic networks, and similar applications. Thus, as the use of optical components continues to increase, with ever-increasing sophistication in the generated or detected optical waveform, there is an ever-increasing need to ensure component quality.

For example, in the related art, transmission and dispersion eye closure quaternary (TDECQ) penalty methodologies are used to qualify optical transmitters (e.g., 5-level pulse amplitude modulation or "PAM-4" transmitters). PAM-4 optical systems may implement signal processing methods at the receiver, and therefore TDECQ is a statistical method for evaluating an optical transmitter performance independent of a receiver. These transmitters, like many transmitters intended for fiber optic communications systems, must transmit waveforms of sufficient quality so that the corresponding receiver with dynamic signal processing can form a communications link with a specified performance. The standardized TDECQ methods numerically implement signal processing in the form of a reference feed-forward equalizer (FFE), which aims to mitigate impairments incurred throughout the link, including impairments associated with the transmitter, the optical channel, and a reference receiver. Transmitters must meet a specified standard of performance using this testing methodology. However, while TDECQ is a useful figure of merit for optical transmitters, it is a computationally intensive iterative process and, therefore, the time, power consumption, and memory required to calculate a TDECQ value is significant. Thus, there are needed improved devices, systems, and methods that provide improved processing of optical components to enhance manufacturing qualification efforts and to ensure performance after deployment.

A second example, in the related art, includes optical quadrature amplitude modulation (QAM) transmitters and receivers. Similar to PAM-4 transmitters in that they generate waveforms with multiple amplitudes, QAM transmitters also use specific phases of the optical signal to encode data. These components thus generate and receive optical signals with both amplitude and phase-modulated to encode data. Again, similar to PAM-4 components, both QAM transmitters and receivers may implement signal processing to ensure high-quality waveforms are generated and received. This includes the ability to process waveforms to mitigate or remove impairments of the transmitter, optical channel, or receiver. These optical components must also be independently qualified during production and usage using methods that account for the implemented dynamic signal processing that are both efficient and accurate. Thus, there is a need to improve systems and methods to provide performance metrics of optical components intended for generating and receive QAM style signal.

Aspects of the present disclosure address these and other considerations. According to some aspects of the present disclosure, the devices, systems, and methods may provide improved functionality to computer systems to quickly and effectively process and/or assess optical components.

SUMMARY

According to an embodiment, there is provided method including: receiving optical output data of an optical device; supplying the optical output data to a trained neural network configured to transform optical output data to optical performance metrics; and executing the trained neural network to transform the supplied optical output data to optical performance metrics for the optical device.

According to an embodiment, there is provided a method of making an optical assessment system, the method including: generating a plurality of optical waveforms from one or more representative devices or systems; assessing the plurality of optical waveforms to determine respective performance qualifications for the one or more representative devices or systems; and operating a neural network to train the neural network with the plurality of optical waveforms and the respective performance qualifications.

According to an embodiment, there is provided a testing device, including: a transmitter configured to output an initial signal to a first optical device, the first optical device being configured to transmit transport the initial signal; an input configured to receive the transmitted transported signal from the first optical device; at least one processor; and a memory having stored thereon instructions that, when executed by the at least one processor, control the at least one processor to: compare the initial signal to the transmitted signal to generate optical output data; supply the optical output data to a trained neural network configured to transform optical output data to optical device performance qualifications; and generate optical output data of the optical device based on the transported signal; supply the optical output data to a trained neural network configured to transform optical output data to optical performance metrics; and execute the trained neural network to transform the supplied optical output data to optical device performance metrics qualifications for the first optical device.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Figure 1A:
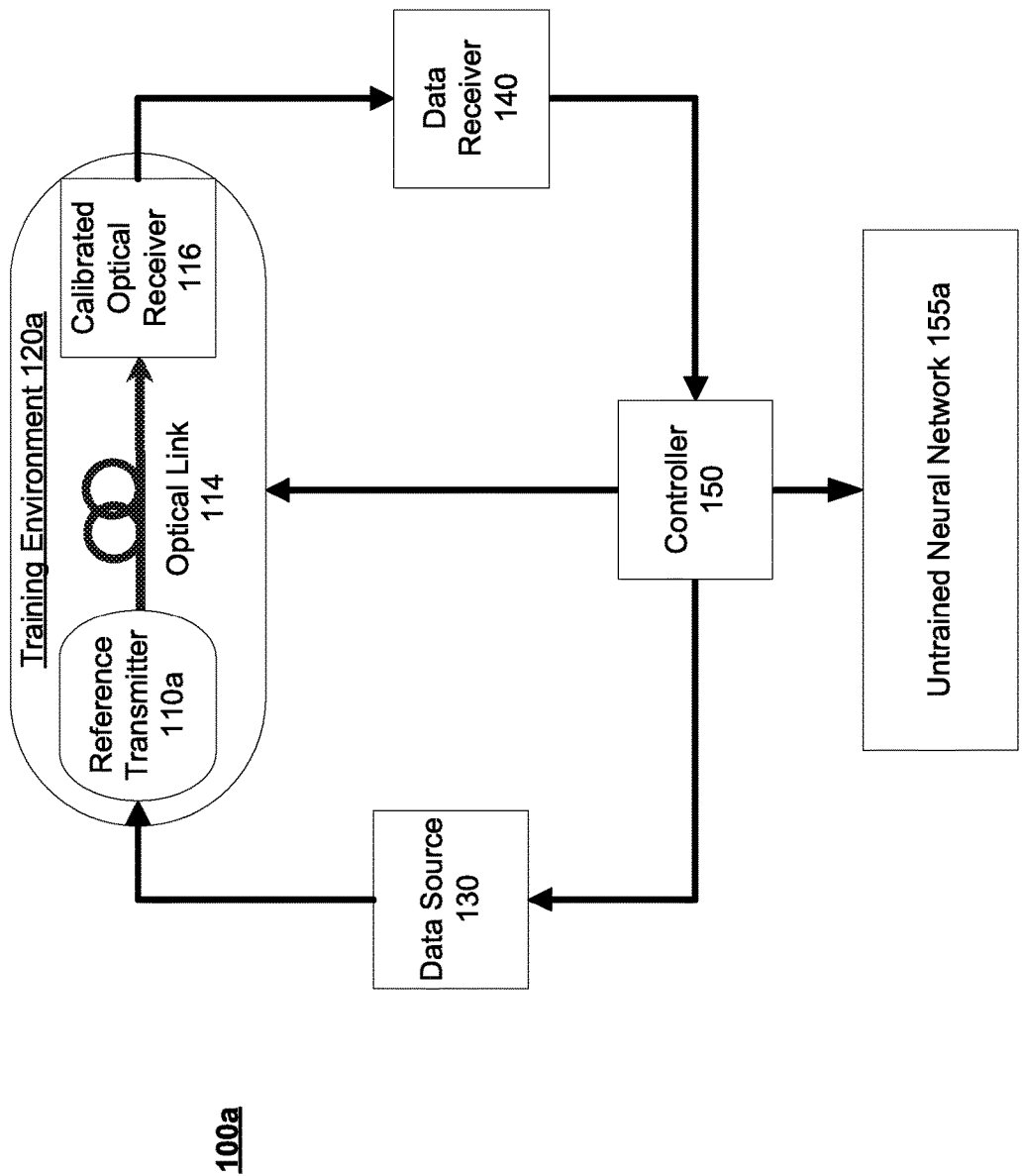
FIGS. 1A-2B are example environments for implementing aspects of the present disclosure.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

It should also be noted that, as used in the specification and the appended claims, the singular forms "a," "an" and "the" include plural references unless the context clearly dictates otherwise. References to a composition containing "a" constituent is intended to include other constituents in addition to the one named.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

To facilitate an understanding of the principles and features of the disclosure, various illustrative embodiments are explained below. The present disclosure, however, is not so limited, and can be applicable in other contexts.

As discussed above, related art assessments of optical components require an intensive, iterative process. Aspects of the present disclosure address these and other considerations. According to some aspects of the present disclosure, the devices, systems, and methods may provide improved functionality to computer systems to quickly and effectively process and/or assess optical components. For example, aspects of the invention transform eye-diagram images or real-time waveforms to assessment values utilizing machine learning. In experiments, the inventors found that implementing aspects of the disclosure increased the speed up to 1000 fold, enhancing the operation of the assessment system.

Aspects of the present disclosure will be described below with reference to the drawings. FIG. 1A illustrates an example environment 100a in which aspects of the present disclosure may be implemented. Environment 100a depicts a block diagram of a training system for training a neural network 155a to associate optical output data (e.g., eye diagrams or waveforms) with component performance metrics. Environment 100a includes a reference transmitter 110a, an optical link 114, and a calibrated optical receiver 116 within a training environment 120a, Reference transmitter 110a is connected to a signal data channel of data source 130. Reference transmitter 110a outputs an optical waveform that is transported over optical link 114 to calibrated optical receiver 116. The calibrated optical receiver 116 receives the optical waveform and converts it to an electrical waveform.

Data receiver 140 receives the electrical waveform from the calibrated optical receiver 116, and digitizes and captures the waveform. Data receiver 140 can include an analog-to-Digital Converter (A to D) and may be, for example, a real-time scope or an equivalent-time sampling scope. Data receiver 140 provides the sampled waveform corresponding to the optical waveform, to controller 150, which determines parameter values for each specified received waveform using algorithms. The waveform is paired with the determined parameters and provided to the untrained neural network 155a as a training sample.

In some cases, the controller 150 (e.g., a computer) can pre-process the waveform, transforming it into an eye diagram, constellation, or other form representing useful features of the waveform. Controller 150 can then pair the transformed waveform with the determined parameters and provide the paired combination to the neural network 155a as a training sample. Similarly, data receiver 140 may pre-process the waveform, transforming it into an eye diagram, constellation, or other form representing the waveform's useful features. In such cases, the transformed waveform (e.g., the eye diagram or constellation) may be provided to the controller 150, which is then provided to untrained neural network 155a as a training sample with a paired determined parameter.

Controller 150 can configure data source 130 and/or training environment 120a so that waveforms representative of a range of performance of transmitters that are to be tested are produced. For example, controller 150 can force data source 130 to output a waveform that causes reference transmitter 110*a* to emulate actual components with various stresses. Further, controller 150 may control optical link 114 and/or calibrated optical receiver 116 to emulate various stresses on the communication link (e.g., reflection, temperature, dispersion, and bandwidth limitations).

Optical link 114 may be a short (e.g., nominal) fiber length connecting the reference transmitter 110*a* to the calibrated optical receiver 116, but this is merely an example. In some cases, optical link 114 may be an optical cable representing a realistic fiber link between a transmitter and receiver, for example. In some cases, optical link 114 may be comprised of multimode fiber, single mode fiber, and/or concatenated lengths of different types of fiber. The optical link 114 may also have passive and active components including, for example, connectors, switches, amplifiers, and filters. In some cases, optical link 114 may be partially or wholly artificial in order to more easily introduce various filters or other stresses into the communication link of training environment 120*a*.

Figure 1B:
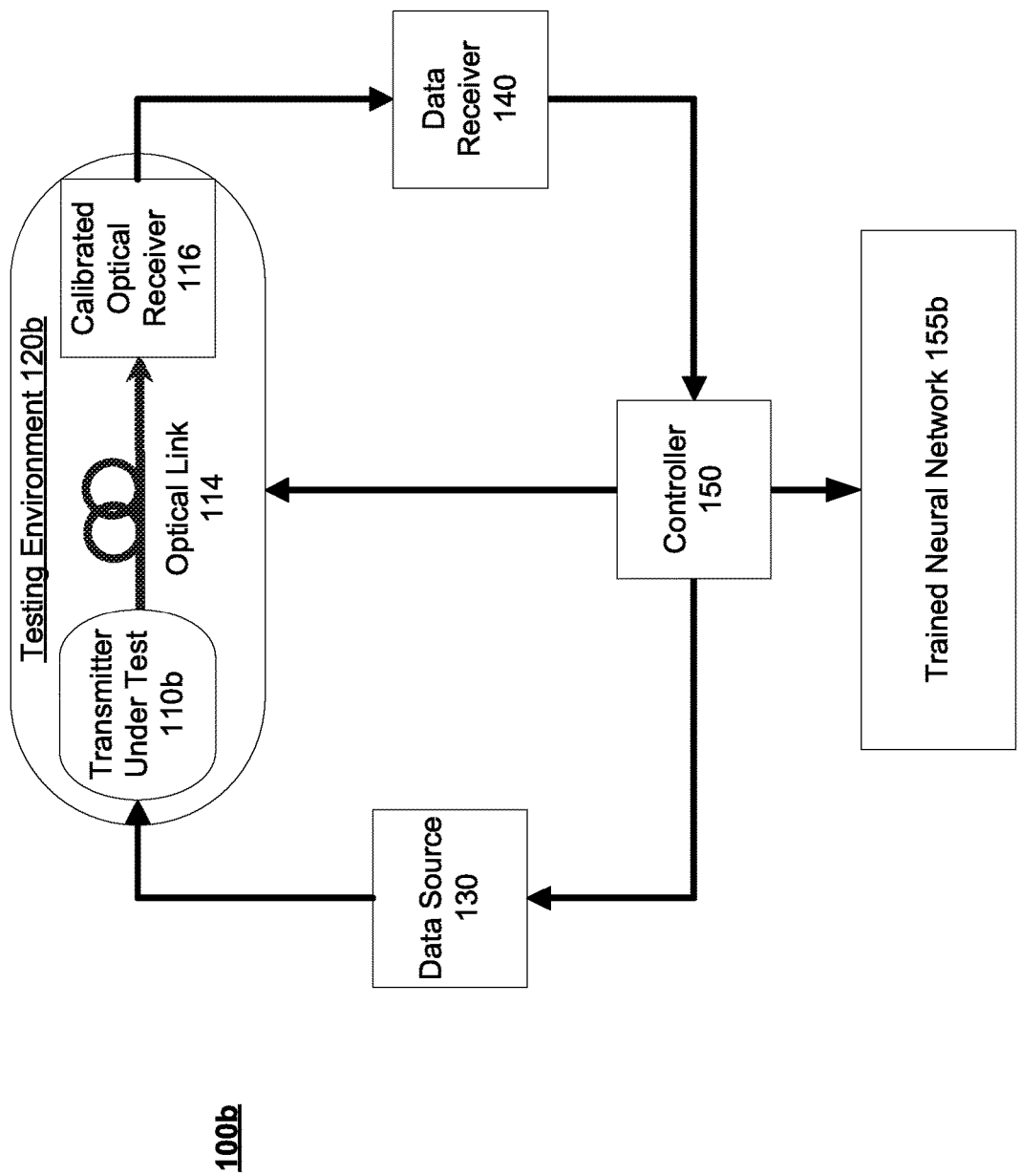

FIG. 1B illustrates an example environment 100*b* in which aspects of the present disclosure may be implemented. Environment 100*b* depicts a block diagram of a testing system for assessing a transmitter under test 110*b* based on its associated optical output data (e.g., eye diagrams or waveforms). Environment 100*b* includes a transmitter under test 110*b*, an optical link 114, and a calibrated optical receiver 116 within a testing environment 120*b*. Reference transmitter 110*b* is connected to a signal data channel of data source 130. Reference transmitter 110*b* outputs an optical waveform that is transported over optical link 114 to calibrated optical receiver 116. The calibrated optical receiver 116 receives an optical waveform and converts it to an electrical waveform.

Data receiver 140 receives the electrical waveform from the calibrated optical receiver 116 and digitizes and captures the electrical waveform. Data receiver 140 can include an analog-to-Digital Converter (A to D) and may be, for example, a real-time scope or an equivalent-time sampling scope. Data receiver 140 provides the sampled waveform to controller 150, which provides the waveform to the trained neural network 155*b*. The trained neural network 155*b* processes the waveform, transforming it to generate parameters of the transmitter under test 110*b*.

In some cases, the controller 150 (e.g., a computer) can pre-process the waveform, transforming it into an eye diagram, constellation, or other form representing useful features of the waveform. Controller 150 can provide the transformed waveform to the neural network 155*b* for testing, and neural network 155*b* can transform the input into parameters of the transmitter under test 110*b*. Similarly, data receiver 140 may pre-process the waveform, transforming it into an eye diagram, constellation, or other form representing useful features of the waveform. In such cases, the transformed waveform (e.g., the eye diagram or constellation) may be provided to controller 150, which is then provided to trained neural network 155*b* for processing.

Controller 150 can configure data source 130 and/or testing environment 120*b* so that waveforms representative of a range of performance of transmitters that are to be tested are produced. For example, controller 150 can force data source 130 to output a stressed waveform to transmitter under test 110*b* in accordance with various testing conditions. Further, controller 150 may control optical link 114 and/or calibrated optical receiver 116 to emulate various stresses on the communication link (e.g., reflection, temperature, and bandwidth limitations).

Optical link 114 may be a short (e.g., nominal) fiber length connecting the reference transmitter 110*b* to the calibrated optical receiver 116, but this is merely an example. In some cases, optical link 114 may be a long optical cable, representing an actual fiber link between a transmitter and receiver, for example. In some cases, optical link 114 may be comprised of multimode fiber or single mode fiber. The optical link 114 may also have passive and active components including for example, connectors, switches amplifiers and filters. In some cases, optical link 114 may be partially or wholly artificial in order to introduce various stresses more easily into the communication link of testing environment 120*b*.

Figure 2A:
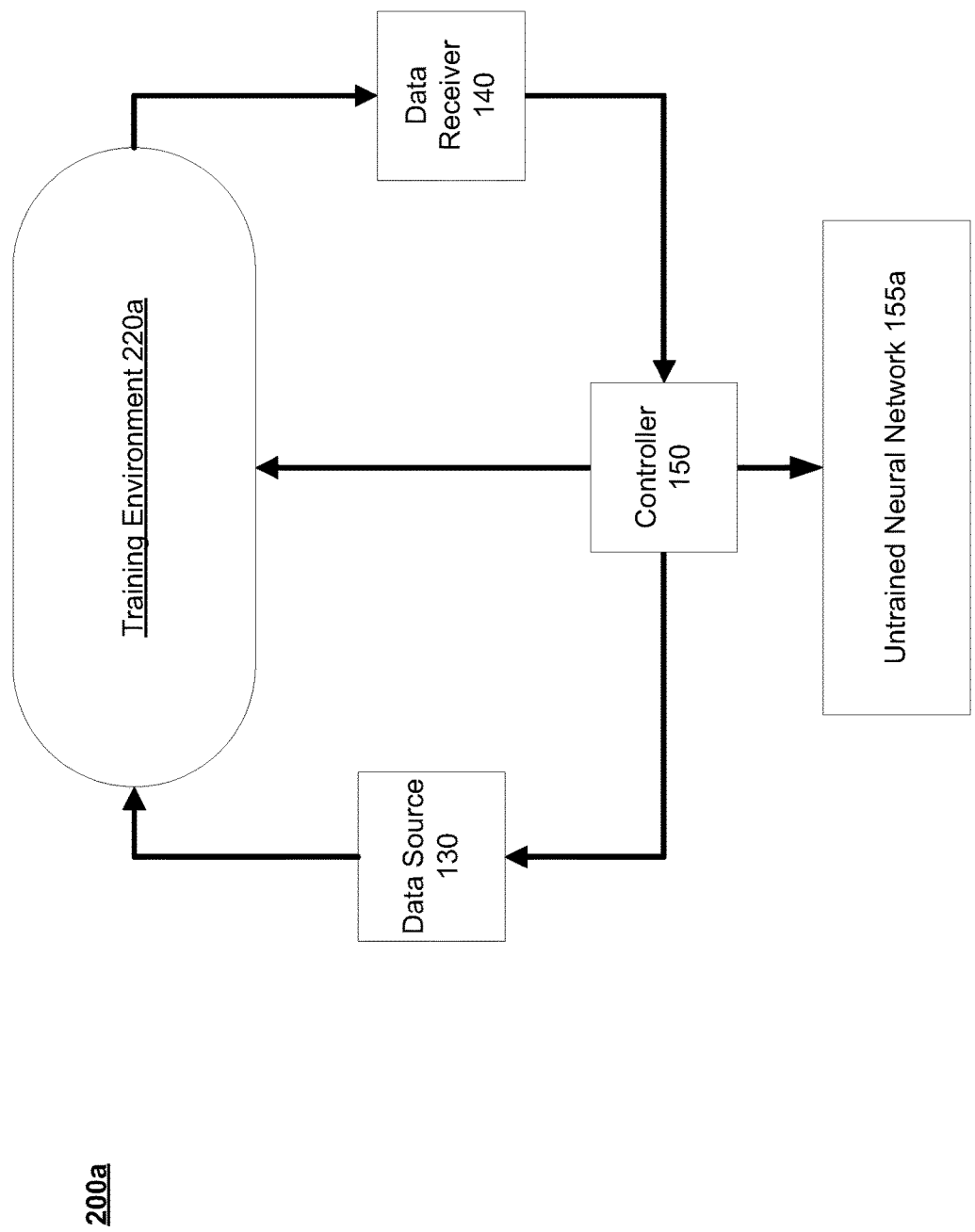

FIG. 2A illustrates an example environment 200*a* in which aspects of the present disclosure may be implemented. Environment 200*a* depicts a block diagram of a training system for training a neural network 155*a* to associate optical output data (e.g., eye diagrams or waveforms) with component performance metrics. Environment 200*a* includes training environment 220*a* connected to a signal data channel of data source 130. Training environment 220*a* may include a communication link comprising one or more optical components to emulate the potential operation of components to be tested later. Example optical components may include components or products that send, receive, or transmit data signals at very high rates, such as high-speed data communication and telecommunication networking equipment, such as switches and routers, fiber optic systems including components, links and/or channels, cables, chip-to-chip communication links, and optical transmitters, receivers, and/or transceivers.

Data receiver 140 receives an electrical waveform from training environment 220*a*, and digitizes and captures the waveform. Data receiver 140 can include an analog-to-Digital Converter (A to D), and may be, for example, a real-time scope or an equivalent-time sampling scope. Data receiver 140 provides the sampled waveform to controller 150, which determines parameter values for each specified received waveform using one or more algorithms. The waveform is paired with the determined parameters and provided to the untrained neural network 155*a* as a training sample.

In some cases, the controller 150 (e.g., a computer) can pre-process the waveform, transforming it into an eye diagram, constellation, or other form representing useful features of the waveform. Controller 150 can then pair the transformed waveform with the determined parameters and provide the paired combination to the neural network 155*a* as a training sample. Similarly, data receiver 140 may pre-process the waveform, transforming it into an eye diagram, constellation, or other form representing useful features of the waveform. In such cases, the transformed waveform (e.g., the eye diagram or constellation) may be provided to the controller 150, which is then provided to untrained neural network 155*a* as a training sample with a paired determined parameter.

Controller 150 can configure data source 130 and/or training environment 220*a* so that waveforms representative of a range of performance of transmitters that are to be tested are produced. For example, controller 150 can force data source 130 to output a waveform that causes environment 220*a* to emulate actual components with various stresses. Further, controller 150 may control other portions of the optical communication link to emulate various stresses on the communication link (e.g., reflection, temperature, and bandwidth limitations).

Figure 2B:
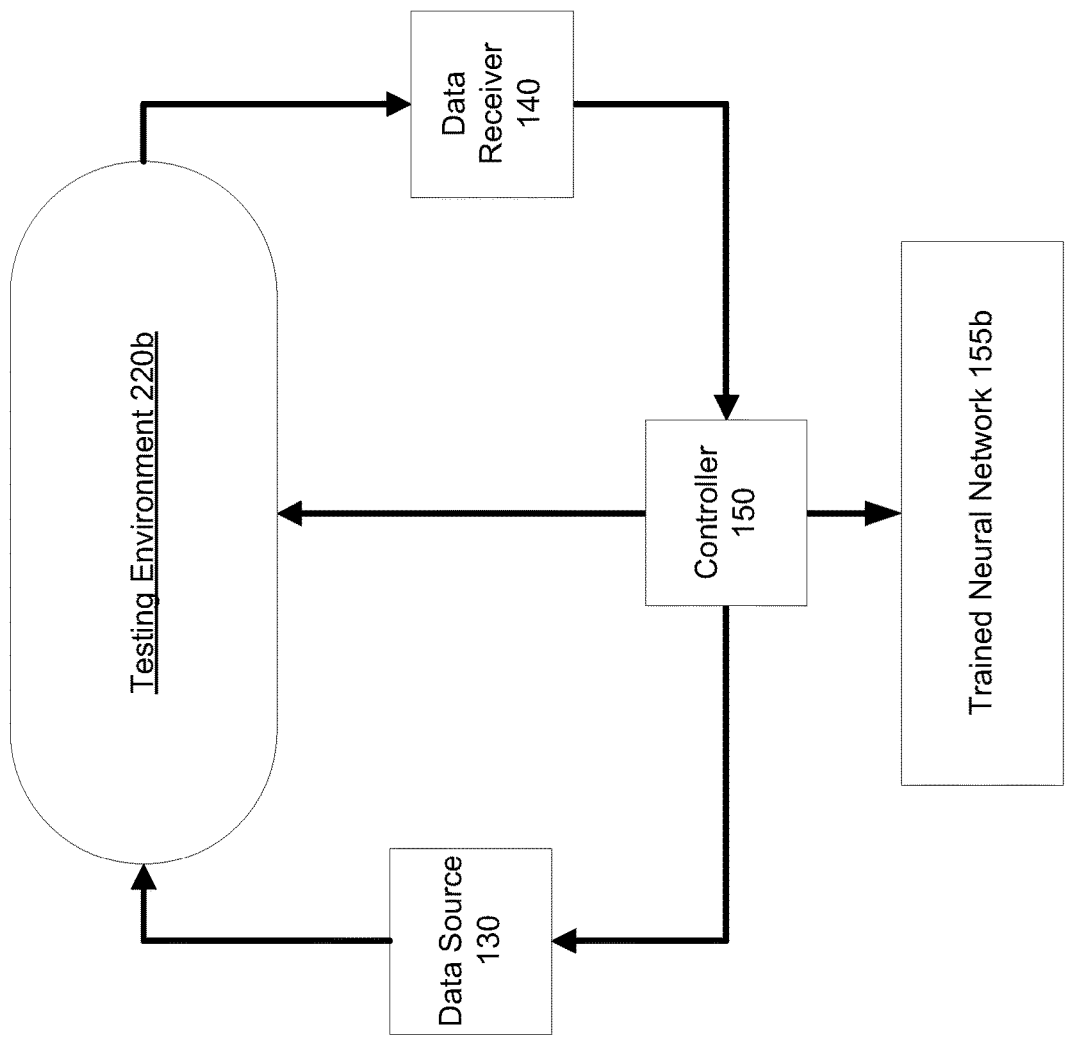

FIG. 2B illustrates an example environment 200b in which aspects of the present disclosure may be implemented. Environment 200b depicts a block diagram of a testing system for assessing a generic optical component under testing with testing environment 220b based on its associated optical output data (e.g., eye diagrams or waveforms). Environment 200b includes a testing environment 220b, which is connected to a signal data channel of data source 130. A component under testing within testing environment 220b transports an electrical waveform to data receiver 140. As will be understood by one of ordinary skill in light of the present disclosure, the component under test may be one or more portions of an optical communication link. For example, optical components under test may include components or products that send, receive, or transmit data signals at very high rates, such as high-speed data communication and telecommunication networking equipment, such as switches and routers, fiber optic systems including components, links and/or channels, cables, chip-to-chip communication links, and optical transmitters, receivers, and/or transceivers.

Data receiver 140 receives the electrical waveform from the calibrated optical receiver 116, and digitizes and captures the electrical waveform. Data receiver 140 can include an analog-to-Digital Converter (A to D), and may be, for example, a real-time scope or an equivalent-time sampling scope. Data receiver 140 provides the sampled waveform to controller 150, which provides the waveform to the trained neural network 155b. The trained neural network 155b processes the waveform, transforming it to generate parameters of the component under test.

In some cases, the controller 150 (e.g., a computer) can pre-process the waveform, transforming it into an eye diagram, constellation, or other form representing useful features of the waveform. Controller 150 can provide the transformed waveform to the neural network 155b for testing, and neural network 155b can transform the input into parameters of the component under test. Similarly, data receiver 140 may pre-process the waveform, transforming it into an eye diagram, constellation, or other form representing useful features of the waveform. In such cases, the transformed waveform (e.g., the eye diagram or constellation) may be provided to controller 150, which is then provided to trained neural network 155b for processing.

Controller 150 can configure data source 130 and/or testing environment 220b so that waveforms representative of a range of performance of transmitters that are to be tested are produced. For example, controller 150 can force data source 130 to output a stressed waveform to testing environment 220b in accordance with various testing conditions. Further, controller 150 may control portions of the optical testing environment 220b other than the component under test to emulate various stresses on the communication link (e.g., reflection, temperature, and bandwidth limitations).

Figure 3:
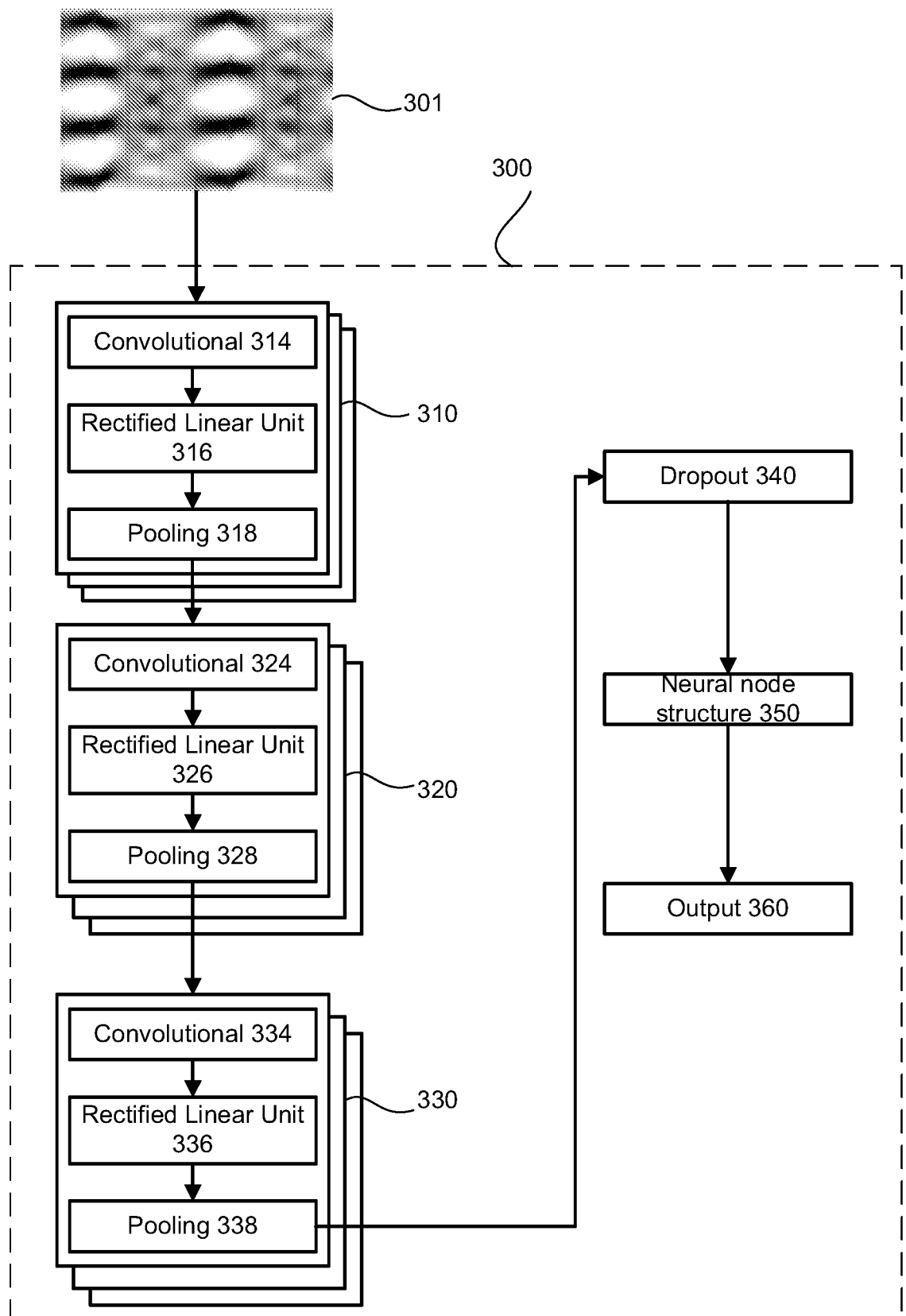
FIG. 3 is a diagram of an example convolutional neural network.

FIG. 3 is a diagram of an example convolutional neural network 300 according to aspects of the present disclosure. Neural network 300 may be neural network 155 implemented by controller 150. Neural network 300 may receive, as input, a waveform or an eye diagram 301, and transform the waveform or diagram into performance qualifications for an optical component (e.g., optical component 110. Neural network 300 may be a convolutional neural network. In some cases, neural network 300 may be a one-dimensional neural network (e.g., for processing a waveform) or a two-dimensional neural network (e.g., for processing an eye diagram). A person of ordinary skill in the art will recognize 155 as the "convolutional neural network" or the "neural network" or although the specific neural node structure 350 (e.g., a fully connected layer) follows the convolutional layers.

Neural network 300 may have a plurality of layers that are configured to extract and/or enhance features, compressing the data, and doing so iteratively. For example, neural network 300 may have two or more layers (e.g., feature extraction layers) 310, 320, 330. Each extraction layer 310, 320, 330 may include a respective convolutional layer 314, 324, 334, a respective rectified liner unit 316, 326, 336, and a pooling layer 318, 328, 338. The first extraction layer 310 may be an input layer 310, receiving as input the waveform or eye diagram 301 or some other output of a pre-processing action. The second convolutional layer 320 may receive the output of the first layer 310 as its input, and perform secondary processing on the waveform or eye diagram 301. The third convolutional layer 330 may receive the output from the second convolutional layer 320 and perform tertiary processing on the waveform or eye diagram 301. A person of ordinary skill in the art will recognize that "convolutional layer" may refer to the plurality of functions and/or divisible layers within the processing layer 310, 320, and 330.

The convolutional and pooling layers of the second and third extraction layers 320, 330 may operate on smaller data sets than the convolutional and pooling layers of the previous extraction layer. For example, input convolutional layer 314 may have a size of, for example, greater than 40×30 (e.g., 47×37) and includes 30 or more filters, second convolutional layer 324 may have a size of greater than 15×15 (e.g., 17×17) and includes 10 or more filters, and the third convolutional layer 334 may have a size of greater than 5×5 (e.g., 7×7) and include 8 filters. Similarly, input pooling layer 318 may have a size of about 41×31 and have a stride of about 15, second pooling layer 328 may have a size of about 13×13 and have a stride of about 6, and the third pooling layer 338 may have a size of about 7×7 and have a stride of about 4. As will be understood by one of ordinary skill, the example given here relates to a two dimensional CNN and that one dimensional CNN are may also or alternatively be implemented. As will be understood by one of ordinary skill, the pooling layers may be a max-pooling layer.

The output from the final convolutional extraction layer 310, 320, 330 is transmitted to a dropout layer 340, which randomly drops out nodes during training to reduce overfitting and improve generalization error in the trained neural network 300. Following the dropout layer 340, the neural node structure 350 outputs the performance qualifications for an optical component. The neural node structure 350 may be, as non-limiting examples, a regression neural network which can take information from the previous layers and map it to a real-valued scalar such as the numerical value of a qualification metric, or a classification layer which takes the information from the previous layers and maps it to one of the many pre-defined entities that were set by the user when training the neural network.

Figure 4:
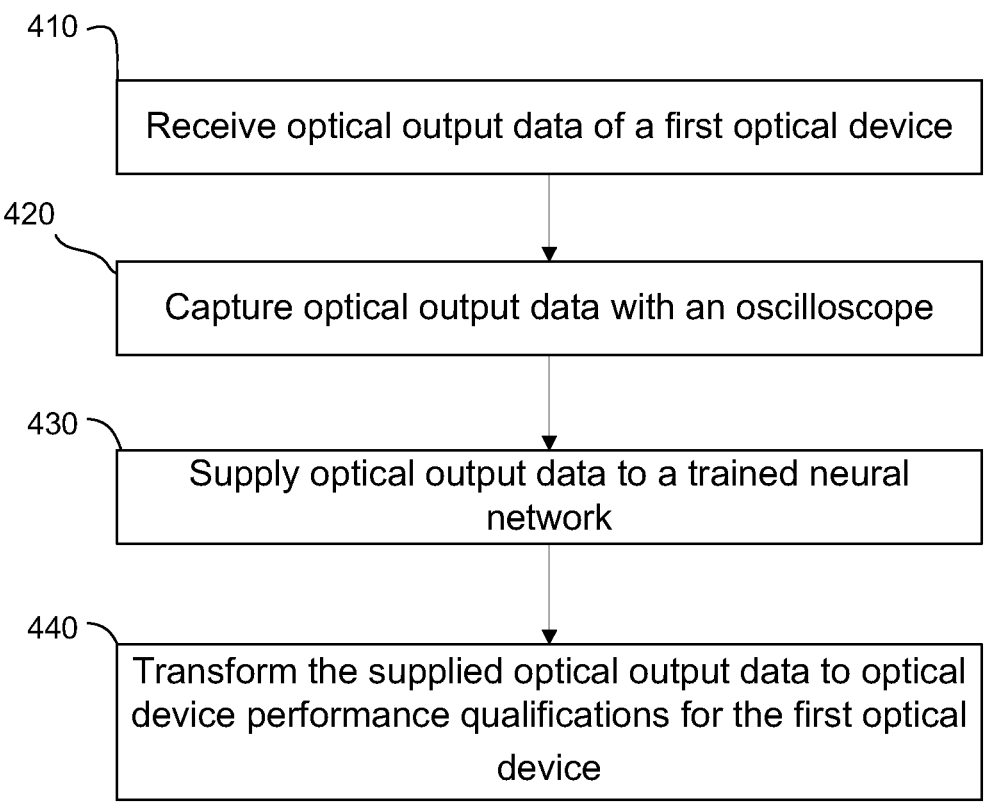
FIG. 4 is a flowchart illustrating optical component assessment according to aspects of the present disclosure.

FIG. 4 is a flowchart 400 illustrating optical component assessment according to an embodiment. The method may be implemented, for example, by a testing system, e.g., testing system 100b or 200b including one or more components illustrated in or described in reference to FIGS. 1B and 2B, but this is merely an example. The testing system receives 410 optical output data of a first optical device (e.g., transmitter under test 110*b*). The optical device can be, for example, an optical transmitter. The testing system captures 420 the optical output data using, for example, an oscilloscope.

In some cases, the output data may be received 410 and captured 420 using a test and measurement device. The test and measurement device may output an initial signal into the first optical device. For example, the initial signal may be intended to be transmitted by or through the first optical device. The first optical device's output may then be read from the first optical device. In some cases, the initial signal is an initial analog signal, and the read signal is a read analog signal. The test and measurement system may first convert the initial digital signal into an initial analog signal, and supply the initial analog signal to the optical device. Similarly, the output of the optical device may be a read analog signal, and the test and measurement machine may convert the read analog signal to a read digital signal before or as part of generating the optical waveform and/or eye diagram. In some cases, the input signal may be fixed for testing, but this is merely an example. In some cases, the input signal may be variable, and the test and measurement system can, for example, compare the initial signal to the read signal to determine optical output data. A variable input signal can be used for testing different aspects or features of an optical device, or to test the optical device for differing conditions. By comparing the input signal to the output signal, the system can adapt to changing tests or circumstances.

The captured optical output data may be an optical waveform. Testing system supplies 430 the captured optical output data to a trained neural network. For example, testing system may supply 430 the optical waveform to the neural network directly. However, this is merely an example. In some cases, testing system may first pre-process the waveform, transforming the waveform into an eye diagram, for example. The testing system may then supply 430 the eye diagram to the neural network.

The neural network is executed 440 to transform the supplied optical output data to optical device performance qualifications for the first optical device. The neural network can be a convolutional neural network. Where the supplied optical output data corresponds to an optical waveform, the neural network may be a one-dimensional neural network. Where the supplied optical output data corresponds to an eye diagram, the neural network may be a two-dimensional neural network. But these are merely examples.

As is known, the performance of optical components may be affected by connected or included electrical components. For example, optical transceivers often include an electric amplifier and an optical modulator. Accordingly, as would be understood by one of ordinary skill in light of the present disclosure, the electrical components may be tested separately from the optical portions of an optical component.

Figure 5:
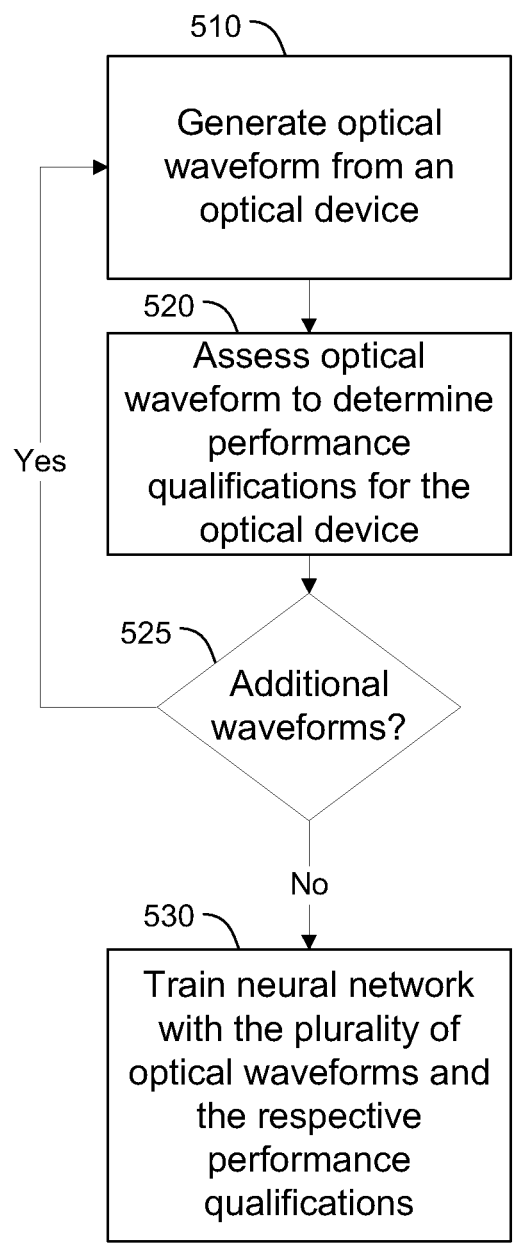
FIG. 5 is a flowchart illustrating neural network training according to aspects of the present disclosure.

FIG. 5 is a flowchart 500 illustrating neural network training according to an embodiment. The method includes generating 510 an optical waveform from an optical device (e.g., a representative optical device). Generating the optical waveform can include placing the optical device in a testing machine, causing the optical device to output waveforms corresponding to a range of behaviors representing impairments or non-ideal performance; and capturing an output from the device using an oscilloscope.

In some cases, generating the optical waveforms may include creating synthetic waveforms corresponding to one or more virtual devices (e.g., virtual optical device) or systems (e.g., an optical communication system). An optical communication system or optical communication link may include an optical transmitter, an optical receiver, an optical path (e.g., a fiber-optic path) connected therebetween, and associated elements. This can include modelling virtual optical devices and creating waveforms based on the modeled device. The created waveforms may correspond to defined device parameters that control the virtual device performance. However, this is merely an example. In some cases, a synthetic waveform may include controlling a laser to output a signal, processing (e.g., modulating) the signal with a modulator, and capturing the modulated signal with an oscilloscope as a synthetic waveform. A plurality of optical waveforms may be created by modifying the output of a data generator connected to the modulator. In some cases, a filter may be implemented across the modulated signal, which can emulate bandwidth limitations. In view of the present disclosure, a person of ordinary skill will recognize that there are alternative methods for creating waveforms representing the desired range of performance of optical devices and systems.

The method additionally includes assessing 520 the optical waveform to determine respective performance qualifications for the optical device. The assessment may be performed, for example, using a related art TDECQ approach. Then, if more waveforms are needed (425—Yes), a new waveform is generated. In a case that generating 510 the optical waveform is done synthetically, a power supplied to the modulator and/or bandwidth of the filter may be adjusted to generate differing waveforms.

Once sufficient waveforms and assessments are compiled (425—No), a neural network is operated to train 530 the neural network with the plurality of optical waveforms and the respective performance qualifications. In some cases, the waveforms are converted into eye diagrams before training the neural network. In this way, the neural network can be trained to process either waveforms directly or eye diagrams. In some cases, waveforms may be processed more quickly but at the cost of slightly less fidelity.

In one embodiment, the neural network, already trained from another testing effort, can be retrained using transfer learning techniques to account for changes in the new testing effort, such as changes in the specific analog-to-digital converter, cables, or other testing hardware. Such transfer learning can reduce the time it takes to retrain train the new neural network while maintaining good performance.

Figure 6:
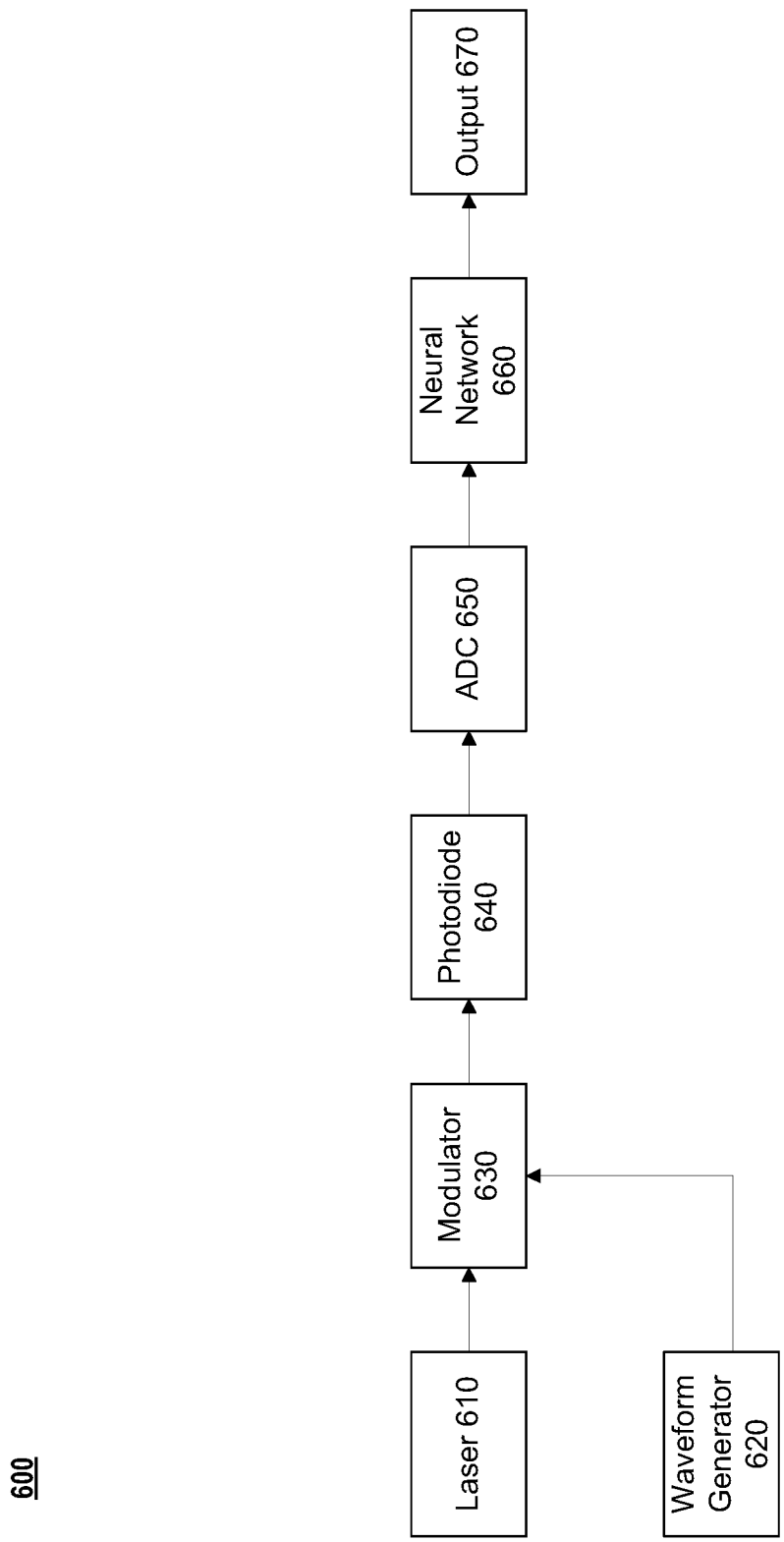
FIG. 6 is a synthetic waveform generation system according to aspects of the present disclosure.

FIG. 6 is a block diagram illustrating a synthetic waveform generation system 600 according to an embodiment. The synthetic waveform generation system 600 may generate synthetic waveforms for training the neural network (e.g., neural network 155 and/or 300). The system 600 may utilize a laser 610 that is modulated by a modulator 630 based on the output of a waveform generator 620. The waveform generator 620 may be an arbitrary waveform generator. Additionally, the system 600 may implement a Gaussian filter to emulate bandwidth limitations. Accordingly, the system 600 can capture dispersive effects of test fibers, similar to the impact of short reach single mode fiber. The modulator 630 drive voltage and/or filter bandwidth can be varied to obtain a plurality of signals eye diagrams. The eye diagrams can be converted using the analog to digital converter 650. These signals eye diagrams can be assessed (e.g., utilizing a related art TDECQ approach) to calculate an assessment value. By performing this repeatedly, a synthetic training set of eye diagrams and assessment values may be generated for training and testing the neural network 660. By utilizing a synthetic waveform generation system 600, a wider range of assessment values and eye-diagram types may be used than would typically be available for a training set. Accordingly, in some cases, the operation of an assessment system may be further improved.

Figure 7:
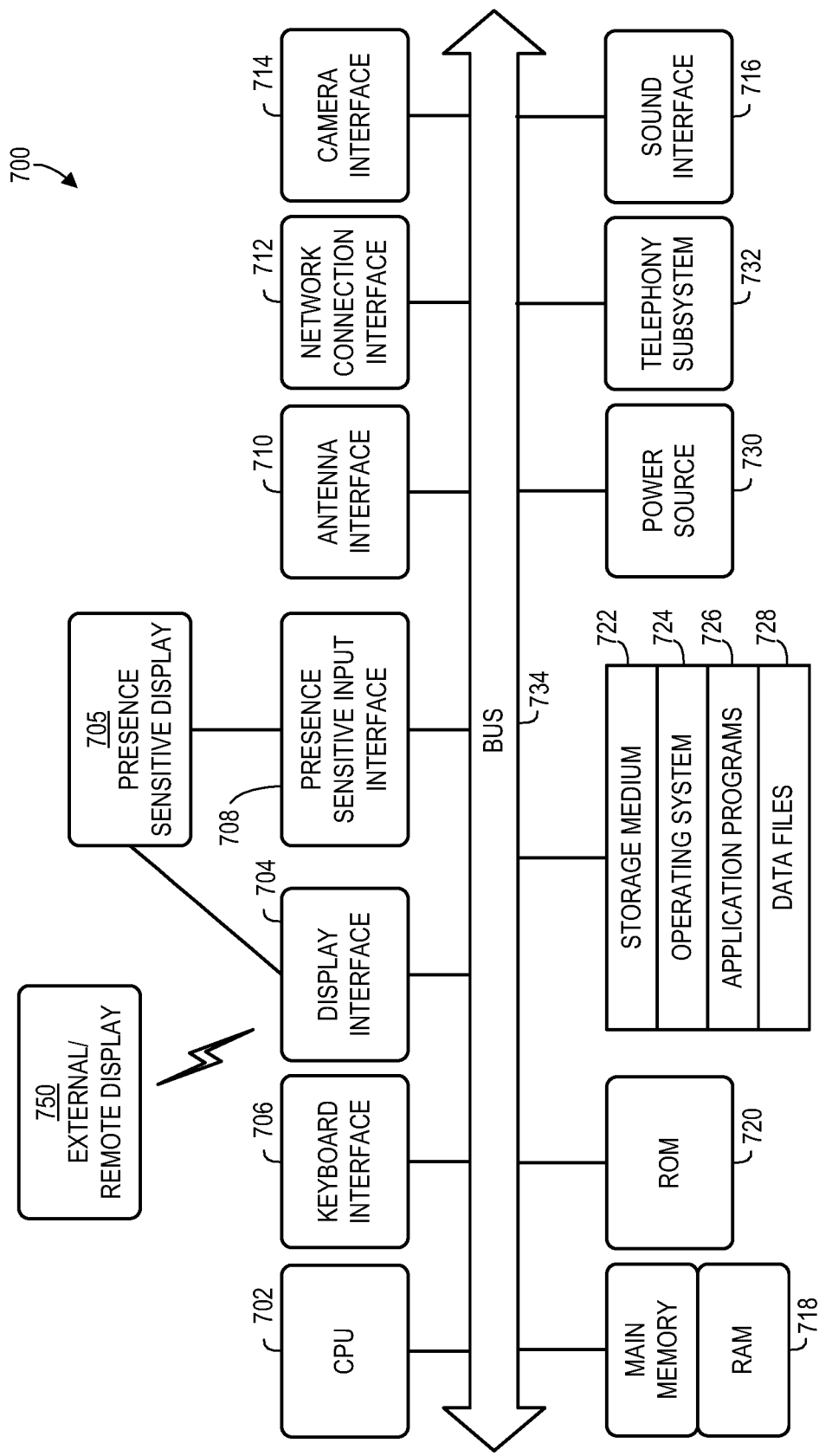
FIG. 7 is a block diagram of an illustrative computer system architecture according to aspects of the present disclosure.

FIG. 7 is a block diagram of an illustrative computer system architecture 700, according to an example implementation. One of ordinary skill, in light of the present disclosure, would understand that aspects of the present disclosure may be implemented using one or more elements from computer system architecture 700. It will be understood that the computing device architecture 700 is provided for example purposes only and does not limit the scope of the various implementations of the present disclosed systems, methods, and computer-readable mediums.

The computing device architecture 700 of FIG. 7 includes a central processing unit (CPU) 702, where computer instructions are processed, and a display interface 704 that acts as a communication interface and provides functions for rendering video, graphics, images, and texts on the display. In certain example implementations of the disclosed technology, the display interface 704 may be directly connected to a local display, such as a touch-screen display associated with a mobile computing device. In another example implementation, the display interface 704 may be configured for providing data, images, and other information for an external/remote display 750 that is not necessarily physically connected to the mobile computing device. For example, a desktop monitor may be used for mirroring graphics and other information that is presented on a mobile computing device. In certain example implementations, the display interface 704 may wirelessly communicate, for example, via a Wi-Fi channel or other available network connection interface 712 to the external/remote display 750.

In an example implementation, the network connection interface 712 may be configured as a communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 704 may be operatively coupled to a local display, such as a touch-screen display associated with a mobile device. In another example, the display interface 704 may be configured to provide video, graphics, images, text, other information, or any combination thereof for an external/remote display 750 that is not necessarily connected to the mobile computing device. In one example, a desktop monitor may be used for mirroring or extending graphical information that may be presented on a mobile device. In another example, the display interface 704 may wirelessly communicate, for example, via the network connection interface 712 such as a Wi-Fi transceiver to the external/remote display 750.

The computing device architecture 700 may include a keyboard interface 706 that provides a communication interface to a keyboard. In one example implementation, the computing device architecture 700 may include a presence-sensitive display interface 708 for connecting to a presence-sensitive display 705. According to certain example implementations of the disclosed technology, the presence-sensitive display interface 708 may provide a communication interface to various devices such as a pointing device, a touch screen, a depth camera, etc. which may or may not be associated with a display.

The computing device architecture 700 may be configured to use an input device via one or more of input/output interfaces (for example, the keyboard interface 706, the display interface 704, the presence sensitive display interface 708, network connection interface 712, camera interface 714, sound interface 716, etc.) to allow a user to capture information into the computing device architecture 700. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 700 or may be a separate device. For example, the input device may be an accelerometer, a magnetometer, a digital camera, a microphone, and an optical sensor.

Example implementations of the computing device architecture 700 may include an antenna interface 710 that provides a communication interface to an antenna; a network connection interface 712 that provides a communication interface to a network. As mentioned above, the display interface 704 may be in communication with the network connection interface 712, for example, to provide information for display on a remote display that is not directly connected or attached to the system. In certain implementations, a camera interface 714 is provided that acts as a communication interface and provides functions for capturing digital images from a camera. In certain implementations, a sound interface 716 is provided as a communication interface for converting sound into electrical signals using a microphone and for converting electrical signals into sound using a speaker. According to example implementations, a random-access memory (RAM) 718 is provided, where computer instructions and data may be stored in a volatile memory device for processing by the CPU 702.

According to an example implementation, the computing device architecture 700 includes a read-only memory (ROM) 720 where invariant low-level system code or data for basic system functions such as basic input and output (I/O), startup, or reception of keystrokes from a keyboard are stored in a non-volatile memory device. According to an example implementation, the computing device architecture 700 includes a storage medium 722 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 724, application programs 726 (including, for example, a web browser application, a widget or gadget engine, and or other applications, as necessary) and data files 728 are stored. According to an example implementation, the computing device architecture 700 includes a power source 730 that provides an appropriate alternating current (AC) or direct current (DC) to power components.

According to an example implementation, the computing device architecture 700 includes a telephony subsystem 732 that allows the device 700 to transmit and receive sound over a telephone network. The constituent devices and the CPU 702 communicate with each other over a bus 734.

According to an example implementation, the CPU 702 has appropriate structure to be a computer processor. In one arrangement, the CPU 702 may include more than one processing unit. The RAM 718 interfaces with the computer bus 734 to provide quick RAM storage to the CPU 702 during the execution of software programs such as the operating system application programs, and device drivers. More specifically, the CPU 702 loads computer-executable process steps from the storage medium 722 or other media into a field of the RAM 718 to execute software programs. Data may be stored in the RAM 718, where the data may be accessed by the computer CPU 702 during execution.

The storage medium 722 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 722, which may include a machine-readable storage medium.

According to one example implementation, the term computing device, as used herein, may be a CPU, or conceptualized as a CPU (for example, the CPU 702 of FIG. 7). In this example implementation, the computing device (CPU) may be coupled, connected, and/or in communication with one or more peripheral devices, such as display. In another example implementation, the term computing device, as used herein, may refer to a mobile computing device such as a Smartphone, tablet computer, or smart watch. In this example implementation, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be used to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

An embodiment of the present disclosure may be implemented according to at least the following:

Clause 1: A method comprising: receiving optical output data of an optical device; supplying the optical output data to a trained neural network configured to transform optical output data to optical performance metrics; and executing the trained neural network to transform the supplied optical output data to optical performance metrics for the optical device.

Clause 2: The method of Clause 1, wherein the optical device comprises an optical transmitter.

Clause 3: The method of Clauses 1 or 2, wherein the performance metrics are related to an optical communications system attached to the optical device.

Clause 4: The method of any of Clauses 1-3, wherein the performance metrics are related to the transmission and dispersion eye closure quaternary (TDECQ) penalty methodologies.

Clause 5: The method of any of Clauses 1-4, wherein the optical device is an optical receiver.

Clause 6: The method of any of Clauses 1-5, wherein the optical output data comprises a waveform of an output of the optical device.

Clause 7: The method of any of Clauses 1-6, wherein the optical output data comprises an eye diagram generated from a waveform of an output of the optical device, the eye diagram being supplied to the trained neural network.

Clause 8: The method of Clause 7 further comprising: receiving the waveform of the output of the optical device; and pre-processing the waveform to transform the waveform into an eye diagram.

Clause 9: The method of any of Clauses 1-8, wherein the trained neural network comprises a convolutional neural network.

Clause 10: The method of Clause 9, wherein the convolutional neural network comprises: a plurality of extraction layers configured to perform convolutional filtering, the optical output data is being fed to a first extraction layer, and the input of subsequent extraction layers being the outputs of previous extraction layers.

Clause 11: The method of Clauses 9 or 10, wherein the convolutional neural network comprises: an input extraction layer having a convolutional filter and a pooling layer, the optical output data being fed to the input extraction layer; a second extraction layer having a convolutional filter and a pooling layer, an output of the input extraction layer being fed to the second extraction layer; and a third extraction layer having a convolutional filter and a pooling layer, an output of the second extraction layer being fed to the third extraction layer.

Clause 12: The method of Clause 11, wherein the pooling layer is a max pooling layer.

Clause 13: The method of any of Clauses 1-12, wherein the trained neural network comprises a two-dimensional convolutional neural network.

Clause 14: The method of any of Clauses 1-12, wherein the trained neural network comprises a one-dimensional convolutional neural network.

Clause 15: The method of any of Clauses 1-4 further comprising capturing the optical output data using a test and measurement device.

Clause 16: The method of Clause 15, wherein the test and measurement device comprises a real-time scope.

Clause 17: The method of Clauses 15 or 16, wherein the test and measurement device comprises an equivalent-time scope.

Clause 18: The method of any of Clauses 1-17, wherein capturing the optical output data comprises: outputting an initial signal into the optical device, the initial signal being transmitted through the optical device; and reading the transmitted signal from the optical device.

Clause 19: The method of Clause 18, wherein the initial signal is an initial analog signal and the read signal is a read analog signal, and the method further comprises: transforming an initial digital signal to generate the initial analog signal; and transforming the read analog signal to a read digital signal.

Clause 20: The method of Clauses 18 or 19, wherein the initial signal is fixed.

Clause 21: The method of Clauses 18 or 19, wherein the initial signal is variable.

Clause 22: The method any of Clauses 1-21, wherein the capturing the optical output data further comprises comparing the initial signal to the read signal.

Clause 23: A method of making an optical assessment system, the method comprising: generating a plurality of optical waveforms from one or more representative devices or systems; assessing the plurality of optical waveforms to determine respective performance qualifications for the one or more representative devices or systems; and operating a neural network to train the neural network with the plurality of optical waveforms and the respective performance qualifications.

Clause 24: The method of Clause 23, wherein generating the plurality of optical waveforms comprises, for each representative device of the one or more representative devices or systems: placing the representative device in a testing machine; and capturing an output from the representative device or system using an oscilloscope.

Clause 25: The method of Clauses 23 or 24, wherein generating the plurality of optical waveforms comprises creating synthetic waveforms corresponding to one or more virtual representative devices or systems.

Clause 26: The method of Clause 25, wherein creating synthetic waveforms comprises: modelling the one or more virtual representative devices; and creating a plurality of waveforms based on the modeled devices. The plurality of waveforms can be representative of a range of performance.

Clause 27: The method of Clauses 25 or 26, further comprising: controlling a laser to output a signal; processing the signal with a modulator; and capturing the modulated signal with an oscilloscope as a synthetic waveform.

Clause 28: The method of Clause 27, wherein the modulator is modified based on an output of a waveform generator.

Clause 29: The method of Clause 28, further comprising adjusting a power unit to the modulator to generate a plurality of differing waveforms.

Clause 30: The method of any of Clauses 27-29 further comprising implementing a filter across the modulated signal.

Clause 31: The method of Clause 30 further comprising adjusting a bandwidth of the filter to generate a plurality of differing waveforms.

Clause 32: A testing device, comprising: a transmitter configured to output an initial signal to an optical device, the optical device being configured to transport the initial signal; an input configured to receive the transported signal from the optical device; at least one processor; and a memory having stored thereon instructions that, when executed by the at least one processor, control the at least one processor to: generate optical output data of the optical device based on the transported signal; supply the optical output data to a trained neural network configured to transform optical output data to optical performance metrics; and execute the trained neural network to transform the supplied optical output data to optical performance metrics qualifications for the optical device.

Clause 33: The system of Clause 32, wherein the optical device comprises an optical transmitter.

Clause 34: The system of Clauses 32 or 33, wherein the performance metrics are related to an optical communications system attached to the optical device.

Clause 35: The system of any of Clauses 32-34, wherein the performance metrics are related to the transmission and dispersion eye closure quaternary (TDECQ) penalty methodologies.

Clause 36: The system of any of Clauses 32-35, wherein the optical device is an optical receiver.

Clause 37: The system of any of Clauses 32-36, wherein the optical output data comprises a waveform of an output of the optical device.

Clause 38: The system of any of Clauses 32-37, wherein the optical output data comprises an eye diagram generated from a waveform of an output of the optical device, the eye diagram being supplied to the trained neural network.

Clause 39: The system of any of Clauses 32-38, wherein the instructions further control the instructions further control the at least one processor to: generate the waveform of the output of the optical device; and pre-process the waveform to transform the waveform into an eye diagram.

Clause 40: The system of any of Clauses 32-39, wherein the trained neural network comprises a convolutional neural network.

Clause 41: The system of Clause 40, wherein the convolutional neural network comprises: a plurality of extraction layers configured to perform convolutional filtering, the optical output data is being fed to a extraction layer, and the input of subsequent extraction layers being the outputs of previous extraction layers.

Clause 42: The system of Clauses 40 or 41, wherein the convolutional neural network comprises: an input extraction layer having a convolutional filter and a pooling layer, the optical output data being fed to the input extraction layer; a second extraction layer having a convolutional filter and a pooling layer, an output of the input extraction layer being fed to the second extraction layer; and a third extraction layer having a convolutional filter and a pooling layer, an output of the second extraction layer being fed to the third extraction layer.

Clause 43. The system of Clause 42, where the pooling layer is a max pooling layer Clause 44: The system of any of Clauses 32-43, wherein the trained neural network comprises a two-dimensional convolutional neural network.

Clause 45: The system of any of Clauses 32-44, wherein the trained neural network comprises a one-dimensional convolutional neural network.

Clause 46: The system of any of Clauses 32-45, wherein the input comprises a real-time scope.

Clause 47: The system any of Clauses 32-46, wherein the input comprises an equivalent-time scope.

Clause 48: The system of any of Clauses 32-47, wherein the initial signal is fixed.

Clause 49: The system any of Clauses 32-47, wherein the initial signal is variable.

Clause 50: The system of any of Clauses 32-49, wherein the capturing the optical output data further comprises comparing the initial signal to the transported signal.

A system comprising: one or more processors; and one or more memories having stored thereon instructions that, when executed by the one or more processors, controls the one or more processors to execute the method of any of Clauses 1-31.

A non-transitory computer-readable medium having stored thereon instructions to execute a method according to any of Clauses 1-31.

In addition to this specification and the prepared drawings, this disclosure includes an appendix detailing the development of a tool in accordance with the present disclosure. It is intended solely for explanatory purposes and not in limitation.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. But other equivalent methods or compositions to these described aspects are also contemplated by the teachings herein. Therefore, the present disclosure should not be limited to any single aspect, but rather construed in breadth and scope in accordance with the appended claims.

What is claimed is:

1. A method comprising:
supplying, to a trained neural network, optical output data comprising an eye diagram generated from a waveform of an output of an optical device; and
transforming, by the trained neural network, the optical output data to optical performance metrics for the optical device;
wherein:
the optical device comprises a device selected from a group consisting of an optical transmitter and an optical receiver;
the optical performance metrics are related to transmission and dispersion eye closure quaternary (TDECQ) penalty methodologies.

2. The method of claim 1 further comprising:
receiving the optical output data of the optical device.

3. The method of claim 1, wherein the optical performance metrics are further related to an optical communications system attached to the optical device.

4. The method of claim 1 further comprising:
receiving the waveform of the output of the optical device; and
pre-processing the waveform to transform the waveform into the eye diagram.

5. A testing device to perform the method of claim 1 comprising:
a transmitter configured to output an initial signal to the optical device, the optical device selected from a group consisting of an optical transmitter and an optical receiver and being configured to transport the initial signal;
an input configured to receive the transported signal from the optical device;
at least one processor; and
a memory having stored thereon instructions that, when executed by the at least one processor, control the at least one processor to:
generate the optical output data of the optical device based on the transported signal;
supply the optical output data comprising the eye diagram generated from the waveform of the output of the optical device to the trained neural network configured to transform the optical output data to the optical performance metrics; and
execute the trained neural network to transform the optical output data to the optical performance metrics qualifications for the optical device, the optical performance metrics being related to transmission and dispersion eye closure quaternary (TDECO) penalty methodologies.

6. A method comprising:
supplying, to a trained convolutional neural network comprising extraction layers configured to perform convolutional filtering, optical output data related to an optical device; and
transforming, by the trained convolutional neural network, the optical output data to one or more optical performance metrics for the optical device;
wherein:
the optical output data is first fed to a first extraction layer of the extraction layers;
an input of each subsequent extraction layer comprises an output of each respective previous extraction layer; and
at least one of the optical performance metrics is a transmission and dispersion eye closure quaternary (TDECQ) measurement metric.

7. The method of claim 6, wherein:
the first extraction layer is an input extraction layer having a convolutional filter and a pooling layer, the optical output data being fed to the input extraction layer;
a second extraction layer of the extraction layers has a convolutional filter and a pooling layer, an output of the input extraction layer being fed to the second extraction layer; and
a third extraction layer of the extraction layers has a convolutional filter and a pooling layer, an output of the second extraction layer being fed to the third extraction layer.

8. The method of claim 7, wherein the pooling layer is a max pooling layer.

9. The method of claim 6 further comprising:
capturing the optical output data using a test and measurement device.

10. The method of claim 9, wherein the test and measurement device comprises a device selected from a group consisting of a real-time scope and an equivalent-time scope.

11. A method comprising:
capturing optical output data related to an optical device using a test and measurement device;
supplying, to a trained neural network, the optical output data; and
transforming, by the trained neural network, the optical output data to one or more optical performance metrics for the optical device;
wherein:
the trained neural network is selected from the group consisting of a convolutional neural network, a two-dimensional convolutional neural network, and a one-dimensional convolutional neural network;

at least one of the optical performance metrics is a transmission and dispersion eve closure quaternary (TDECO) measurement metric; and the capturing of the optical output data comprises:
outputting an initial analog signal from the test and measurement device into the optical device;
outputting an analog transmitted signal from the optical device; and
reading the analog transmitted signal from the optical device.

12. The method of claim 11 further comprising:
transforming an initial digital signal to generate the initial analog signal; and
transforming the analog transmitted signal to a read digital signal.

13. The method of claim 11, wherein the initial analog signal is selected from a group consisting of a fixed initial analog signal and a variable initial analog signal.

* * * * *